July 31, 1934.  R. H. CARTER  1,968,373
SWIVEL TROLLEY CONVEYER
Original Filed Aug. 18, 1932    2 Sheets-Sheet 2
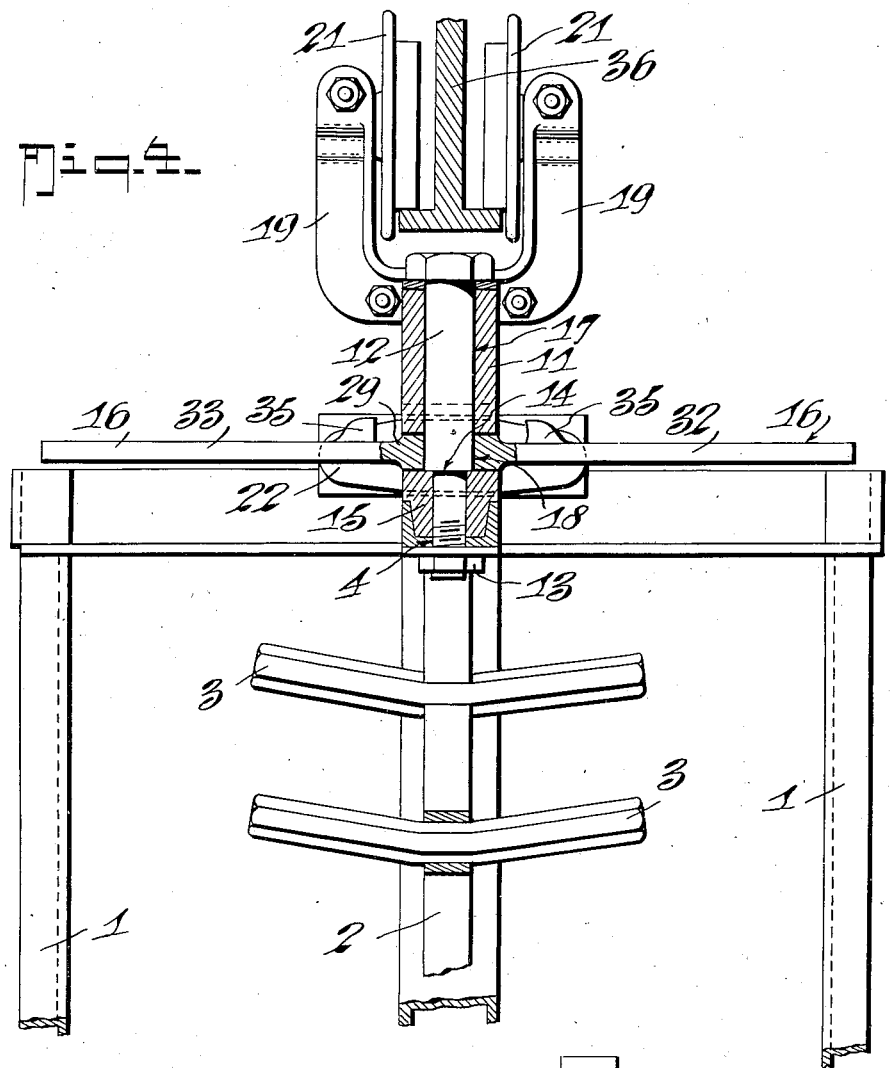

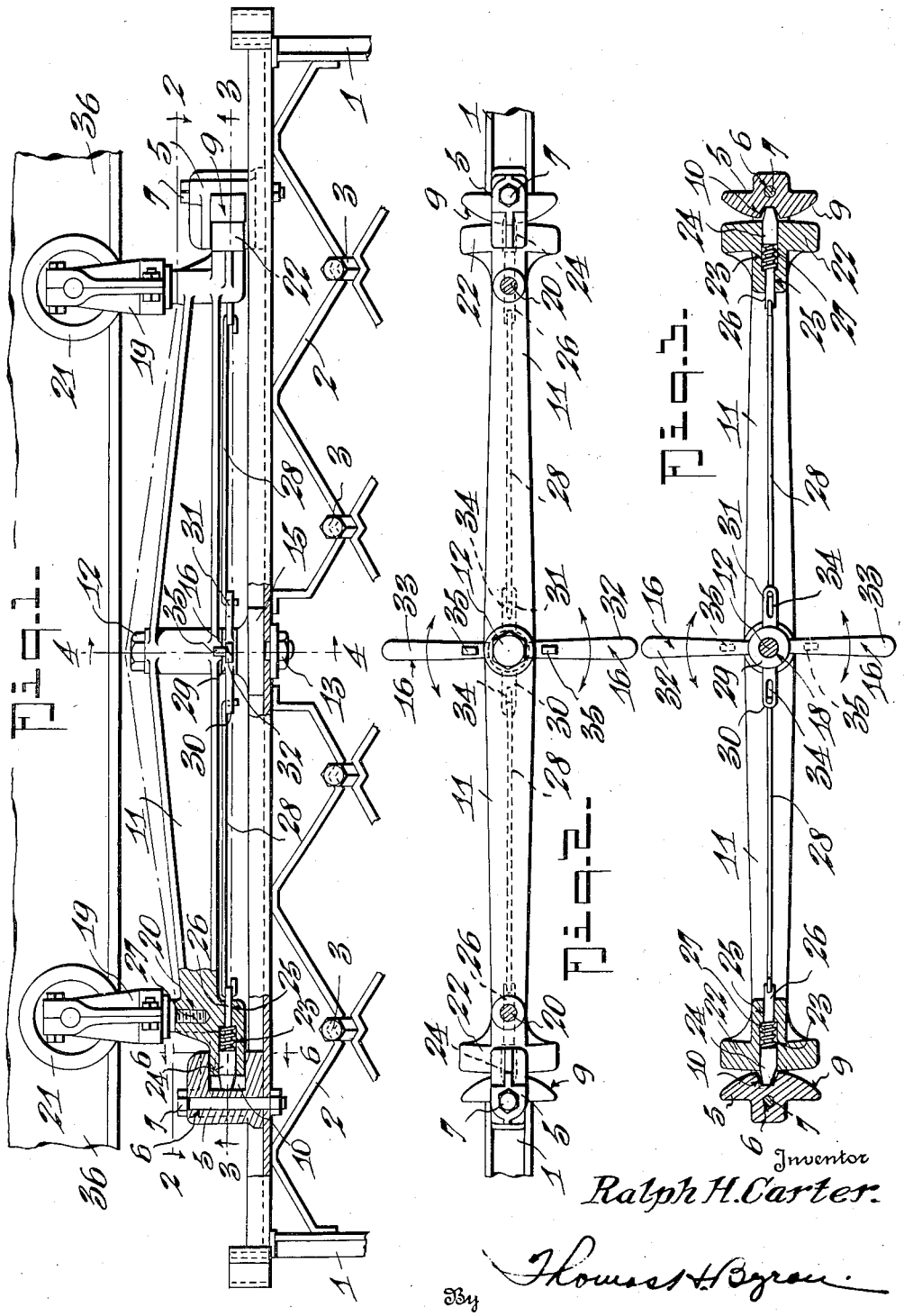

Patented July 31, 1934

1,968,373

UNITED STATES PATENT OFFICE 1,968,373

SWIVEL TROLLEY CONVEYER

Ralph H. Carter, Johnson City, Tenn., assignor to North American Rayon Corporation, New York, N. Y., a corporation of Delaware Original application August 18, 1932, Serial No. 629,376. Divided and this application April 8, 1933, Serial No. 665,122

6 Claims. (Cl. 105—156)

The subject matter of this application has been divided out of my pending application, Serial Number 629,376, filed August 18, 1932.

This invention relates to improvements in transportion means, but has more specifically for its object to devise an overhead trolley means which will facilitate the handling of articles conveyed by the transported carrying means.

Another object of the present invention is to devise an improved construction securing the transporting rack or carrier to a monorail transportation system, said construction comprising the provision of a load bar to which the rack is swivelly connected and provided at both ends with latching mechanisms which engage in corresponding latches on the rack to hold the rack stationary with respect to said load bar in its normal position, the latch actuating means being arranged on the swivel connection. The load bar is also provided with trolleys to engage the monorail.

These and other objects of my present invention will become more apparent from a study of the following description and by reference to the attached drawings, in which:

Figure 1 is a side elevation and part sectional view of my invention as attached to a monorail, a portion of a rack carried by the swivel arrangement being shown as applied to my invention;

Figure 2 is a horizontal section of the line 2—2 of Figure 1;

Figure 3 is a horizontal section of lines 3—3 of Figure 1;

Figure 4 is an enlarged vertical cross section on the line 4—4 of Figure 1;

Figure 5 is a detail top plan view of one of the latching blocks;

Figure 6 is an enlarged detail section on the line 6—6 of Figure 1; and

Figure 7 is an enlarged side elevation of one of the latching blocks.

In the conveyance of racks from one place to another by the monorail, it is frequently desired to be able to swivel the rack. For example, as shown in the drawings, the rack illustrated is designed to carry articles on both sides and in bringing the rack up along side of a machine or unloading station, much time can be saved by swivelling said rack approximately 180° and bringing into position the other side of the rack for placing the articles on that side in position for unloading or placing upon a machine after the first side is empty. It will thus be seen that I have provided a convenient and improved construction of trolley for transporting racks in a monorail manner.

In the drawings, in which like numerals of reference indicate like parts, 1 indicates a carrier rack, having a central article supporting grill 2 which is rigid in construction and which stiffens the carrier rack so that it will withstand the hard usage to which it will be subjected in the manufacturing plant. Hexagonal bars 3 are integrally positioned at spaced points on the grill 2 for the purpose of hanging any desired articles for conveyance from one place to another. As illustrated in Figure 1, the top of the carrier 1 is provided with a centrally located opening 4 and a pair of spaced latch blocks 5. Each of these blocks 5 (see Figures 5 and 7), has formed therein a vertical bore 6 for the bolt 7 which secures the same to the carrier. Each block is also provided with a horizontal opening 8, the inner wall 9 of which is provided with a centrally located recess 10 for a purpose to be hereinafter described.

As is shown in Figure 4, the carrier or rack 1 is swivelled on the connecting device or load bar 11, by means of the bolt or pin 12 secured in the opening 4 by the nut 13. This bolt or pin 12 is provided with a shoulder 14 to prevent binding of the sleeve or block 15 against the latch actuating means 16 when the nut 13 is tightened. The bolt or pin 12 fits loosely in the vertical bore 17 formed in the load bar and in the opening 18 formed in the latch actuating means 16 so that the carrier may be swivelled thereon without difficulty. The trolley brackets 19 are secured in the openings 20 formed in the load bar by any suitable means such as by pins or the like and carry the rollers 21 which ride on the monorail 36.

As is shown in Figures 2 and 3, the load bar 11 is provided with enlarged ends 22. Since these ends are identical in construction only one will be described in detail, it being understood that both ends of the load bar are alike in every respect. A horizontal bore 23, serving as a housing for the latch pin 24, is formed in the end of the load bar and is provided at its inner end with a communicating bore 25 in which is located the shank 26 of the latch pin 24. A spring 27 is positioned at the head of the latch pin and the inner wall of the housing and serves to hold the latch pin 24 in its normal locking position. A wire or rod 28 connects each latch pin 24 to the latch actuating means 16. The outer end of each latch pin is tapered slightly, in the embodiment shown about 15°, for a purpose to be hereinafter described. The outer surface of the enlarged end of the load bar is convexed and the said enlarged end 22 is of such dimension as to fit in the horizontal opening of the latch blocks 5 secured to carrier 1. The latch pins 24, as hereinbefore stated, are connected to the actuating means 16 by means of the wires or rods 28. This latch actuating means 16 comprises a central portion 29 having four arms 30, 31 and 32, 33 extending outwardly therefrom, the opposed arms 30, 31 of which are provided with alternate slots 34 in which the inner ends of the wires or rods 28 move. This arrangement prevents the distortion of the wires 28 when the latch pins 24 are depressed by the convex surfaces of the latch blocks 5. The opposed arms 32, 33 serve as handles to rotate the actuating means in order to retract the latch pins 24 and are provided with bosses 35 which act as stops contacting with the load bar 11 to prevent the distortion of the wires 28 when the latch actuating means 17 is turned in either direction.

In operation the articles to be carried by the carrier rack 1 are loaded onto the bars 3 on one side of the grill 2. When it is desired to swivel the carrier rack 1, the operator disengages the latch pins 24 from the openings 10 in the latch blocks 5, by movement of the handles 32, 33, in either direction permitting the carrier rack 1 to be rotated about the swivel bolt or pin 12, to bring the unloaded side of the rack 1 into filling position. Because of the convex shape of the inner walls of the openings of the latch blocks 5, the latch pins 24 are gradually forced inwardly against the tension of the springs 27 as the rack 1 reaches its new position, and because of the tapered ends of the pins 24 and the correspondingly shaped recesses 10 formed in the inner walls of the openings formed in the latch blocks 5, the latch pins 24 slip positively into operative position when the rack has been rotated 180°. Moreover because of the curvature of the enlarged ends (Figure 6) the said enlarged ends 22 are guided into horizontal alignment with the openings 10 of the latch blocks 5. By this construction, the latching is done automatically and any tendency of the rack 1 to rotate past the desired position is prevented. When fully loaded with the articles to be conveyed, the rack 1 may then be moved along the monorail 36 being supported during its travel therealong at three points, viz.: at each latch block 5 and at the swivel point 12. By such arrangement undue vibration of the rack is prevented and at the same time, the load is well distributed and not concentrated at one point.

Having now described my invention as required by the patent statutes, what I desire to claim is:

1. Means for connecting a conveyer to a conveying system comprising a pair of spaced latch blocks secured to said conveyer, a load bar having means adapted to engage said conveying system for movement therein, a bolt swivelly connecting said conveyer to said load bar, a housing formed in each end of said load bar, spring actuated latch pins secured therein for engagement with said latch blocks, and means associated with said bolt for disengaging said pins from said blocks.

2. Means for connecting a conveyer to a conveying system comprising a pair of spaced latch blocks secured to said conveyer, each block having horizontally disposed openings formed therein, the inner wall of each opening being convex and provided with a centrally located recess formed therein, a load bar, having enlarged ends, housings formed in each of said ends, spring actuated latch pins positioned therein and adapted normally to engage in said recesses formed in said blocks, the convex surface thereof automatically depressing said latch pins and guiding said latch pins into engagement with said recesses as the conveyer is swung into operative position.

3. Means for connecting a conveyer to a conveying system comprising a pair of spaced latch blocks secured to said conveyer, each block having horizontally disposed openings formed therein, the inner wall of each opening being convex and provided with a centrally located recess formed therein, a load bar having enlarged ends, a housing formed in each of said ends, spring actuated latch pins positioned therein and adapted normally to engage in said recesses formed in said blocks, the convex surface thereof automatically depressing said latch pins and guiding said latch pins into engagement with said recesses as the conveyer is swung into operative position, the ends of said bar being tapered to automatically bring into horizontal alinement the latching mechanism.

4. Means for connecting a conveyer to a conveying system comprising a pair of spaced blocks secured to said conveyer, a load bar, a bolt swivelly connecting said conveyer to said load bar, spring actuated latch pins carried by said load bar and engaging in operative position said blocks, means to disengage said latch pins from said blocks including a handle rotatably mounted on said bolt, and means extending therefrom and secured to said latch pins whereby upon movement of said handle the latch pins are retracted into inoperative position.

5. Means for connecting a conveyer to a conveying system comprising a pair of spaced blocks secured to said conveyer, a load bar, a bolt swivelly connecting said conveyer to said load bar, spring actuated latch pins carried by said load bar and engaging in operative position said blocks, means to disengage said latch pins from said blocks including a handle rotatably mounted on said bolt, and wires extending therefrom and secured to said latch pins whereby upon movement of said handle the latch pins are retracted into inoperative position.

6. Means for connecting a conveyer to a conveying system comprising a pair of spaced blocks secured to said conveyer, a load bar, a bolt swivelly connecting said conveyer to said load bar, spring actuated latch pins carried by said load bar and engaging in operative position said blocks, means to disengage said latch pins from said blocks including a handle rotatably mounted on said bolt and provided with oppositely extending arms and means extending therefrom and engaging said latch pins whereby upon movement of said handle the said latch pins are disengaged from said blocks, and stops on said handle to limit the movement thereof.

RALPH H. CARTER.